United States Patent [19]
Lee et al.

[11] Patent Number: 5,858,527
[45] Date of Patent: Jan. 12, 1999

[54] BIAXIALLY ORIENTED POLYESTER FILM

[75] Inventors: Kwang-Hyung Lee, Suwon; Seung-Soo Woo, Kwacheon-si, both of Rep. of Korea

[73] Assignee: SKC Limited, Kyungki-do, Rep. of Korea

[21] Appl. No.: 739,252

[22] Filed: Oct. 29, 1996

[30] Foreign Application Priority Data

| Oct. 30, 1995 | [KR] | Rep. of Korea | 1995-38216 |
| Oct. 30, 1995 | [KR] | Rep. of Korea | 1995-38217 |
| Oct. 31, 1995 | [KR] | Rep. of Korea | 1995-38449 |
| Oct. 31, 1995 | [KR] | Rep. of Korea | 1995-38451 |

[51] Int. Cl.$^6$ .......................... B32B 27/18; B32B 27/20; B32B 27/36
[52] U.S. Cl. .................. 428/327; 428/480; 428/694 ST; 428/694 SG; 428/910
[58] Field of Search .................. 428/323, 327, 428/328, 329, 330, 331, 480, 910, 694 ST, 694 SL

[56] References Cited

U.S. PATENT DOCUMENTS

| 5,006,589 | 4/1991 | Sakamoto et al. | 524/430 |
| 5,096,773 | 3/1992 | Sakamoto | 428/323 |
| 5,164,439 | 11/1992 | Sakamoto et al. | 524/425 |
| 5,194,327 | 3/1993 | Takahashi et al. | 428/327 |
| 5,569,532 | 10/1996 | Lee et al. | 428/327 |

*Primary Examiner*—Vivian Chen
*Attorney, Agent, or Firm*—Anderson, Kill & Olick, P.C.

[57] ABSTRACT

A biaxially oriented polyester film consisting essentially of a polyester resin, polytetrafluoroethylene resin particles having an average particle diameter of 3 to 8 $\mu$m in an amount ranging from 0.3 to 0.6% by weight based on the weight of the polyester resin, and a polyacrylate dispersant in the amount 0.05 to 5 wt % based on the weight of polytetrafluoroethylene particles. The film possesses excellent surface properties, e.g., abrasion resistance, scratch resistance, transparency, void resistance, surface smoothness, slurry stability, running property and dielectric strength.

2 Claims, No Drawings

BIAXIALLY ORIENTED POLYESTER FILM

FIELD OF THE INVENTION

The present invention relates to a biaxially oriented polyester film having excellent surface properties.

BACKGROUND OF THE INVENTION

Polyesters such as polyethylene terephthalate (PET) and polyethylene naphthalate (PEN) are known to possess good chemical stability, physical and mechanical strength, durability, heat resistance, chemical resistance, weather resistance and electrical insulation property; and, therefore, have been widely used in manufacturing various articles including medical devices, capacitors, packaging and labelling materials, photographic film and magnetic recording media.

Polyester films having embossed surface are often prepared so as to improve surface properties of the film. The embossing can be typically formed by incorporating inert particles such as particles of calcium carbonate, silicon oxide, aluminum oxide and kaolin into the raw materials during the production of the film, or by forming inorganic particles in situ.

Japanese Patent Laid-open Publication No. 214734/1990 discloses the use of light calcium carbonate particles and α-, γ- or δ-alumina particles to enhance the scratch resistance of a polyester film. Further, Japanese Patent Laid-open Publication No. 151231/1992 describes the use of a mixture of light calcium carbonate particles and a colloidal silica to impart scratch and abrasion resistance to a polyester film.

However, the above methods have various problems. For example, light calcium carbonate particles tend to wear out easily due to their low hardness, and when a film containing them is used as the base film of a video tape, it is easily scratched, e.g., by a guide roll during a magnetic layer coating process thereof and by a calendering roll during a calendering process. The scratching of the base film may cause the drop-out phenomena of the magnetic tape.

Moreover, calcium carbonate particles have a low affinity to a polyester resin, which may lead to the formation of voids during a draw process of the film and lowering of the dielectric strength of the film. Such voids may cause the film surface to abrade and the calcium carbonate particles to fall off, and accordingly, such polyester film is easily damaged when used as a magnetic tape. Also, a polyester film having a low dielectric strength is not suitable in preparing an electric product, e.g., an capacitor.

Further, the use of alumina particles brings out the problems that a stable slurry containing a high alumina content is difficult to prepare due to the thickening effect of the alumina particles. Silica particles, on the other hand, are used to improve the clarity of a polyester film, but they have a low affinity to the polyester resin and induce the formation of voids during a draw process as well as the formation of rough protrusions on the film during a winding process.

SUMMARY OF THE INVENTION

It is, therefore, an object of the present invention to provide a biaxially oriented polyester film having excellent surface properties, e.g., abrasion resistance, scratch resistance, transparency, void resistance, surface smoothness, slurry stability, running property and dielectric strength, by way of incorporating polytetrafluoroethylene resin particles as an organic slip agent in the film alone or in combination with the conventional inorganic slip agent particles.

In accordance with an aspect of the present invention, there is provided a biaxially oriented polyester film comprising polytetrafluoroethylene resin particles having an average particle diameter ranging from 0.01 to 20 μm in an amount ranging from 0.01 to 4% by weight based on the polyester resin content of the film.

DETAILED DESCRIPTION OF THE INVENTION

The polyester film of the present invention is characterized by containing polytetrafluoroethylene resin particles having an average particle diameter ranging from 0.01 to 20 μm in an amount ranging from 0.01 to 4% by weight based on the polyester resin content of the film.

A polyester resin suitable for use in preparing the polyester film of the present invention may be prepared by transesterifying and polycondensing a dialkyl ester of an aromatic dicarboxylic acid with an aliphatic glycol. The transesterification and polycondensation reactions may be carried out in a batch or continuous mode, while a direct, one-step polymerization may also be used for the preparation of the polyester resin. Preferred polyester resin is polyethylene terephthalate or polyethylene naphthalate.

Representative dialkyl esters of aromatic dicarboxylic acid which may be employed in the present invention include: dialkyl esters of terephthalic acid, isophthalic acid, naphthalenedicarboxylic acid, cyclohexanedicarboxylic acid, diphenoxyethanedicarboxylic acid, biphenyldicarboxylic acid, diphenyl ether dicarboxylic acid, anthracenedicarboxylic acid and α,β-bis(2-chlorophenoxy)ethane-4,4'-dicarboxylic acid. Among them, dimethyl terephthalate and dimethyl-2,6-naphthalate are most preferred.

Exemplary aliphatic glycols which may be used in the present invention are ethylene glycol, trimethylene glycol, tetramethylene glycol, pentamethylene glycol, hexamethylene glycol and hexylene glycol. Among them, ethylene glycol is most preferred.

A more preferred polyester resin for use in the present invention includes 80 wt % of ethylene terephthalate or ethylene naphthalate repeating units and 20 wt % of copolymeric repeating units derived from other dicarboxylic acids, oxycarboxylic acids and/or diols. Such dicarboxylic acids and oxycarboxylic acids include: isophthalic acid, p-β-hydroxyethoxy benzoic acid, diphenyl dicarboxylic acid, benzophenone-4,4'-dicarboxylic acid, diphenylethane-4,4'-dicarboxylic acid, adipic acid, sebacic acid, sodium 3,5-di(hydroxycarbonyl)benzene sulfonate, p-oxybenzoic acid and the like; and said other diols include: propylene glycol, neopentyl glycol, diethylene glycol, cyclohexane dimethanol and the like.

The transesterification catalyst which can be used in preparing the polyester resin of the present invention may be any one conventionally used in the art such as sodium, manganese, potassium, lithium, calcium, magnesium, barium, zinc, zirconium, cobalt, aluminum and cadmium compounds, and a mixture thereof. Further, the polycondensation catalyst which can be used in the present invention may be any one conventionally used in the art such as titanium, germanium, tin, antimony, zinc, cobalt, aluminum, lead, manganese and calcium compounds, and a mixture thereof.

Polytetrafluoroethylene (PTFE) resin used in the present invention as a slip agent have an average molecular weight in the range of 1,000,000 to 10,000,000. A PTFE resin having a melting point of about 330° C. is particularly preferred.

The PTFE resin particles which may be used in the present invention have an average diameter ranging from 0.01 to 20 μm, preferably from 0.05 to 4.0 μm; and are used in an amount ranging from 0.01 to 4.0 wt %, preferably from 0.01 to 2.0 wt % based on the weight of the polyester resin employed.

A dispersant may be employed in order to assist the dispersion of PTFE resin particles in a polyester resin. Preferred dispersant for use in the present invention is a polyacrylate of $R_1$—$(CH_2CHCOOM)_n$ wherein $R_1$ represents a $C_{9-32}$ hydrocarbon, M represents an ionic group such as sodium and ammonium and n is an integer of 5 to 20. The dispersant may be employed in an amount ranging from 0.05 to 5.0 wt %, preferably from 0.1 to 5.0 wt % based on the weight of the PTFE resin employed.

The dispersant may be introduced at a temperature ranging from 30° to 160° C., preferably from 30° to 120° C., after stirring the mixture of the polyester resin and the PTFE resin particles.

The polyester film of the present invention may further comprise other slip agents, in addition to the PTFE resin particles. Other slip agents which can be employed in the present invention include light calcium carbonate particles, spherical silica particles, alumina particles and a mixture thereof.

Preferred calcium carbonate particles have an average diameter ranging from 0.01 to 3 μm, preferably from 0.1 to 2.5 μm; and they may be employed in an amount ranging from 0.01 to 4.0 wt %, preferably from 0.05 to 2.0 wt % based on the weight of the polyester resin.

Preferred spherical silica has an average particle diameter ranging from 0.1 to 1.0 μm, preferably from 0.15 to 0.7 μm, and it may be employed in the present invention in an amount ranging from 0.01 to 4 wt %, preferably from 0.05 to 2.0 wt % based on the weight of the polyester resin.

Preferred alumina particles may be γ- or δ-alumina particles having a MOHS hardness of greater than 6, and they have an average particle diameter ranging from 0.005 to 3.0 μm, preferably from 0.01 to 1.5 μm and may be employed in the present invention in an amount ranging from 0.01 to 4 wt %, preferably from 0.05 to 2.0 wt % based on the weight of the polyester resin.

The above-mentioned slip agent particles may be added to the polyester resin in the form of a powder or a slurry dispersed in a glycol, but the slurry form is preferred, i.e., they may be preferably dispersed in ethylene glycol optionally with a dispersant, before adding to the polyester resin.

Besides the slip agents, the polyester film of the present invention may further contain other common additives such as antioxidants, antistatic agents, heat stabilizers and dyes. Such additives may be added at any time during the preparation of the polyester, preferably during the transesterification step or immediately prior to the polycondensation step.

The biaxially oriented polyester film of the present invention may be prepared as follows. A mixture of a polyester resin having a molecular weight of about 20,000, PTFE resin particles and optional other slip agent particles is melt-extruded into an amorphous cast sheet through a T-die method, and the resulting sheet is subsequently quenched on a cold roll and then biaxially oriented to produce a biaxially extended polyester film. At the biaxial extending step, the longitudinal and lateral extensions may be conducted at a temperature ranging from 60° to 150° C. in a draw ratio of 2.5 to 6.0.

The thickness of the biaxially oriented polyester film may be controlled depending on the final use of the film, typically in the range of 2 to 200 μm.

The following Examples are intended to illustrate the present invention more specifically, without limiting the scope of the invention.

In the Examples and Comparative Examples, the characteristics of the slip agents employed and the properties of the polyester films produced were evaluated in accordance with the following methods.

1. Average Particle Diameter

The average diameter of particles was measured as a volumetric average diameter in an ethylene glycol slurry by employing a centrifugation type granulometer (SA-CP2, Shimadzu in Japan).

2. Slurry Viscosity

The viscosity of an ethylene glycol slurry of slip agent particles was measured at a spindle speed of 60 rpm using B type viscometer (Brookfield in England) at room temperature.

3. Molecular Weight

The molecular weight of a polymer was measured by a molecular weight measuring apparatus (150C, Waters in U.S.A.) using m-cresol as the mobile phase at a flow rate of 1 ml/min. and at a column temperature of 100° C.

4. Slurry Stability 100 cc of an ethylene glycol slurry of slip agent particles was placed in a 100 ml volumetric cylinder and allowed to stand while observing the status of the slurry. The stability of the slurry was evaluated on the basis of the following criteria:

⊚ (excellent): when no phase separation occurs within 7 days
○ (good): when phase separation occurs after 5 days
Δ (common): when phase separation occurs after 3 days
× (poor): when phase separation occurs after 1 days

5. Surface Smoothness

The surface smoothness of a 30 mm×20 mm×15 μm polyester film sample was determined with a contact type surface roughness gauge (SURFCORDER SE-30D, Kosaka Institute in Japan).

Average Surface Roughness at Centerline($R_a$): Height of a line parallel to a mean line of a roughness curve where the areas of both sides of the line become equal.

Highest Height at Centerline($R_t$): Distance from the highest point to the lowest point within the area measured.

6. Transparency

The transmittance of a 5 cm×5 cm film sample was determined as a haze value, a ratio of the amount of light scattered to the amount of light injected as measured by using a haze measuring apparatus (L-211, Gardener Laboratories in U.S.A).

The transparency of the film was classified on the basis of the following criteria:

⊚ (excellent): haze value≦1.0
○ (good): 1.0<haze value≦1.2
Δ (common): 1.2<haze value≦1.4
× (poor): 1.4<haze value

7. Abrasion Resistance

The abrasion resistance was determined by running a ½ inch-wide film sample against a guide pin of a running tester TBT-300D(Yokohama System Institute in Japan) at a running speed of 3.3 cm/sec, and observing visually or with a microscope, the degree of white powder formation on the surface of the guide pin.

The abrasion resistance was evaluated on the basis of the following criteria:

⊚: No white powder was formed on the surface of the guide pin.

○: Up to 20% of the surface of the guide pin was covered by a white powder.

Δ: Up to 50% of the surface of the guide pin was covered by a white powder.

×: The whole surface of the guide pin was covered by a white powder.

8. Scratch Resistance

The scratch resistance was determined by running a ½ inch-wide film sample over a running length of 90 m against a guide pin of a running tester with a surface roughness of 0.2S, at a contact degree (Θ) of 180° and a contact speed of 3.3 cm/minute, and at a temperature of 25° C. and a relative humidity of 60%, while controlling the inlet tension of the tester to 30 g. After two such runs, the film surface was examined with a microscope for damages caused by the guide pin.

The scratch resistance was evaluated on the basis of the following criteria:

⊚: 2 or less scratch lines were formed on the surface of the film.

○: 3 to 4 scratch lines were formed on the surface of the film.

Δ: 5 to 6 scratch lines were formed on the surface of the film.

×: 7 or more scratch lines were formed on the surface of the film.

9. Running Property

The running property was measured by running a ½ inch wide tape at 20° C. and at a relative humidity of 60% using a tape running tester (TBT-300D, Yokohama System Institute in Japan), and then calculating the initial running friction coefficient $\mu k$ by using the following equation:

$$\mu k = 0.733 \log(T_{out}/T_{in})$$

wherein:

$T_{in}$ is a tension of the tape at the inlet of the tester; and $T_{out}$ is a tension of the tape at the outlet of the tester.

Running property at a high speed

The running property of the film at a high speed was measured by rotating the guide pin either in the running or in the reverse direction, setting the winding angle of the film at 180° and then measuring the running friction coefficient at a speed of 50 cm/sec and at a tension of 300 g.

The running property at a high speed was classified on the basis of the following criteria:

⊚: $\mu k \leq 0.10$:excellent

○: $0.10 < \mu k < 0.20$:good

Δ: $\mu k = 0.20$:common

×: $\mu k > 0.20$:poor

10. Void Resistance

The void resistance of a film was determined by observing the void formed around slip agent particles with a scanning electronic microscope (SEM) (Shimazu Co. in Japan) at a magnification of 10,000. The diameters of the void and the slip agent were measured and the void rate was calculated using the following formula:

$$\text{void rate} = \frac{\text{(Diameter of the void} - \text{Diameter of the slip agent particle)}}{\text{diameter of the void}} \times 100$$

The void resistance was classified on the basis of the following criteria:

⊚: void rate of less than 1.1

○: void rate ranging from 1.1 to 1.4

Δ: void rate ranging from 1.4 to 1.7

×: void rate higher than 1.7

11. Dielectric Strength

The dielectric strength was determined by measuring the endurable amount of voltage per thickness of a film sample using a voltage tester (Tamadensoku Co. in Japan) and classified on the basis of the following criteria:

⊚: when the voltage exceeds 500 v/$\mu$m

○: when the voltage ranges from 450 to 500 v/$\mu$m

Δ: when the voltage ranges from 400 to 450 v/$\mu$m

×: when the voltage is less than 400 v/$\mu$m

EXAMPLE 1

Dimethyl-2,6-naphthalate and ethylene glycol were mixed in a molar ratio of 1:2 and transesterified in the presence of a transesterification catalyst. To the resultant, polytetrafluoroethylene (PTFE) resin particles (TEFLON®, DuPont) having an average particle diameter of 1.8 $\mu$m was added as a slip agent in an amount of 0.60 wt % based on the resin, and the resulting mixture was polycondensed to obtain a polyethylene naphthalate (PEN) resin having an average molecular weight of about 20,000.

The PEN resin was then melt-extruded using a T-die method to form a cast sheet and the sheet was oriented at 90° C. in a draw ratio of 3.0 in both the longitudinal and transverse directions to provide a biaxially oriented PEN film having a thickness of 50 $\mu$m.

EXAMPLES 2 TO 4

The procedure of Example 1 was repeated except for varying the particle diameter and the amount of the PTFE resin within the scope of the present invention, as shown in Table 1.

EXAMPLE 5

The procedure of Example 1 was repeated except that calcium carbonate particles having an average particle diameter of 0.42 $\mu$m were added in an amount of 0.20 wt % as another slip agent, besides the PTFE resin.

EXAMPLES 6 TO 9

The procedure of Example 1 was repeated except that inorganic particles as shown in Table 1 were employed as additional slip agents.

COMPARATIVE EXAMPLES 1 AND 10

The procedure of Example 1 was repeated except that inorganic particles were employed without the PTFE resin, as shown in Table 1.

The properties of the PEN films thus obtained were measured and the results are shown in Table 1.

EXAMPLE 10

Dimethyl terephthalate and ethylene glycol were mixed in a molar ratio of 1:2 and transesterified in the presence of a transesterification catalyst. To the resultant, PTFE resin particles (TEFLON®, DuPont) having an average particle diameter of 1.8 μm was added in an amount of 0.60 wt % as a slip agent, and thereafter, a polyacrylate dispersant (POISE 521, a product of Kao Co. in Japan) was added thereto at 50° C. in an amount of 1 wt % based on the weight of the PTFE resin employed. The resulting mixture was polycondensed to obtain polyethylene terephthalate (PET) resin having a molecular weight of about 20,000.

The PET resin was then melt-extruded using a T-die method to form a cast sheet and the sheet was oriented at 90° C. in a draw ratio of 3.0 in both the longitudinal and transverse directions to provide a biaxially oriented PET film having a thickness of 50 μm.

EXAMPLES 11 TO 13

The procedure of Example 10 was repeated except for varying the particle diameter and the amount of the PTFE resin, and the component of the dispersant, as shown in Table 1.

EXAMPLE 14

The procedure of Example 10 was repeated except that calcium carbonate having an average particle diameter of 0.42 μm was added in an amount of 0.20 wt % as another slip agent, besides the PTFE resin.

EXAMPLES 15 TO 18

The procedures of Example 11 to 13 were repeated except that inorganic particles as shown in Table 1 were employed as additional slip agents.

The properties of the PET films thus obtained were measured and the results are shown in Table 1.

TABLE 1

| | Slip Agent | | | Slurry Viscosity | | Surface Smoothness | | | | | | | | |
|---|---|---|---|---|---|---|---|---|---|---|---|---|---|---|
| | Component | D. (μm) | Amount (%) | .(cps)** | M.W.* | $R_t$ (μm) | $R_a$ (μm) | S.S. | A.R. | S.R. | T. | R.P. | V.R. | St. |
| Ex. 1 | PTFE | 1.8 | 0.60 | — | 18,500 | 0.420 | 0.036 | — | ◉ | ◉ | ◉ | — | ◉ | ◉ |
| Ex. 2 | PTFE | 2.5 | 0.50 | — | 19,000 | 0.631 | 0.045 | — | ◉ | ◉ | ◉ | — | ◉ | ◉ |
| Ex. 3 | PTFE | 7 | 0.40 | — | 18,600 | 0.675 | 0.056 | — | ◉ | ◉ | ◉ | — | ◉ | ◉ |
| Ex. 4 | PTFE | 8 | 0.30 | — | 18,300 | 0.789 | 0.073 | — | ◉ | ◉ | ◉ | — | ◉ | ◉ |
| Ex. 5 | PTFE + Calcium Carbonate** | 1.8/0.42 | 0.60/.2 | — | 18,700 | 0.480 | 0.039 | — | ◉ | ◉ | — | ◉ | ◉ | ◉ |
| Ex. 6 | PTFE + Calcium Carbonate + Spherical Silica | 2.5/0.42/0.3 | 0.50/.2/0.3 | — | 19,200 | 0.655 | 0.048 | — | ◉ | ◉ | — | ◉ | ◉ | ◉ |
| Ex. 7 | PTFE + Calcium Carbonate + α-Alumina | 7/0.42/0.2 | 0.40/.2/0.3 | — | 18,900 | 0.699 | 0.056 | — | ◉ | ◉ | — | ◉ | ◉ | ◉ |
| Ex. 8 | PTFE + Calcium Carbonate + Spherical Silica + α-Alumina | 8/0.42/0.3/0.2 | 0.30/.2/0.3/0.3 | — | 18,800 | 0.791 | 0.074 | — | ◉ | ◉ | — | ◉ | ◉ | ◉ |
| Ex. 9 | PTFE + Calcium Carbonate + Spherical Silica + γ-Alumina | 2.5/0.42/0.3/0.3 | 0.40/.2/0.3/0.3 | — | 19,100 | 0.675 | 0.044 | — | ◉ | ◉ | — | ◉ | ◉ | ◉ |
| Com. Ex. 1 | Calcium Carbonate | 0.40 | 0.30 | — | 17,700 | 0.364 | 0.021 | — | X | X | X | X | X | X |
| Com. Ex. 2 | Calcium Carbonate | 0.54 | 0.20 | — | 17,800 | 0.400 | 0.023 | — | X | X | X | X | X | X |
| Com. Ex. 3 | Calcium Carbonate | 0.65 | 0.15 | — | 17,900 | 0.475 | 0.028 | — | X | X | X | X | X | X |
| Com. Ex. 4 | γ-Alumina | 0.10 | 0.25 | — | 18,600 | 0.288 | 0.018 | — | X | Δ | ○ | Δ | ○ | ○ |
| Com. Ex. 5 | δ-Alumina | 0.30 | 0.15 | — | 18,300 | 0.356 | 0.025 | — | X | Δ | ○ | ○ | ○ | ○ |

TABLE 1-continued

| | Slip Agent | | | Properties | | | | | | | | | | |
|---|---|---|---|---|---|---|---|---|---|---|---|---|---|---|
| | | | | Slurry Viscosity | | Surface Smoothness | | | | | | | | |
| | Component | D. ($\mu$m) | Amount (%) | (cps)** | M.W.* | $R_t$ ($\mu$m) | $R_a$ ($\mu$m) | S.S. | A.R. | S.R. | T. | R.P. | V.R. | St. |
| Com. Ex. 6 | Θ-Alumina | 0.35 | 0.14 | — | 18,400 | 0.363 | 0.026 | — | X | Δ | ○ | Δ | ○ | ○ |
| Com. Ex. 7 | Calcium Carbonate + Alumina | 0.40 / 0.10 | 0.30/ 0.25 | — | 18,400 | 0.432 | 0.027 | — | X | Δ | X | Δ | Δ | Δ |
| Com. Ex. 8 | Calcium Carbonate + γ-Alumina | 0.54 / 0.20 | 0.20/ 0.20 | — | 18,800 | 0.467 | 0.030 | — | X | ○ | X | ○ | Δ | Δ |
| Com. Ex. 9 | Calcium Carbonate + Spherical Silica | 0.65 / 0.30 | 0.15/ 0.15 | — | 18,900 | 0.485 | 0.032 | — | X | ○ | X | Δ | Δ | Δ |
| Com. Ex. 10 | Calcium Carbonate + Spherical Silica + Θ-Alumina | 0.53 / 0.50 | 0.20/ 0.20 | — | 19,000 | 0.399 | 0.025 | — | X | ○ | ○ | ○ | Δ | Δ |
| Ex. 10 | PTFE | 1.8 | 0.60 | 80[1)] | 18,500 | 0.420 | 0.036 | ⊚ | ⊚ | ⊚ | ⊚ | — | ⊚ | ⊚ |
| Ex. 11 | PTFE | 2.5 | 0.50 | 70[2)] | 19,000 | 0.631 | 0.045 | ⊚ | ⊚ | ⊚ | ⊚ | — | ⊚ | ⊚ |
| Ex. 12 | PTFE | 7 | 0.40 | 55[1)] | 18,600 | 0.675 | 0.056 | ⊚ | ⊚ | ⊚ | ⊚ | — | ⊚ | ⊚ |
| Ex. 13 | PTFE | 8 | 0.30 | 50[2)] | 18,300 | 0.789 | 0.073 | ⊚ | ⊚ | ⊚ | ⊚ | — | ⊚ | ⊚ |
| Ex. 14 | PTFE + Calcium Carbonate | 1.8/ 0.42 | 0.60/0.2 | 80[1)] | 18,800 | 0.455 | 0.038 | ⊚ | ⊚ | ⊚ | — | ⊚ | ⊚ | ⊚ |
| Ex. 15 | PTFE + Calcium Carbonate + Spherical Silica | 2.5/ 0.42 /0.3 | 0.50/0.2/0.3 | 70[2)] | 19,000 | 0.651 | 0.047 | ⊚ | ⊚ | ⊚ | — | ⊚ | ⊚ | ⊚ |
| Ex. 16 | PTFE + Calcium Carbonate + α-Alumina | 7/0.42/0.2 | 0.40/0.2/0.3 | 55[1)] | 19,000 | 0.633 | 0.055 | ⊚ | ⊚ | ⊚ | — | ⊚ | ⊚ | ⊚ |
| Ex. 17 | PTFE + Calcium Carbonate + Spherical α-Alumina | 8/0.42/0.3/0.2 | 0.30/0.2/0.3/0.3 | 50[2)] | 18,900 | 0.766 | 0.069 | ⊚ | ⊚ | ⊚ | — | ⊚ | ⊚ | ⊚ |
| Ex. 18 | PTFE + Calcium Carbonate + Spherical Silica + γ-Alumina | 2.5/ 0.42 /0.3 /0.3 | 0.40/0.2/0.3/0.3 | 70[2)] | 19,100 | 0.669 | 0.043 | ⊚ | ⊚ | ⊚ | — | ⊚ | ⊚ | ⊚ |

*Number average molecular weight, **Light Calcium Carbonate
***Viscosity of a slurry containing the PTFE resin and the dispersant in ethylene glycol
[1)]$R_1$—$(CH_2CHCOONH_4)_{11}$, [2)]$R_1$—$(CH_2CHCOONa)_{10}$
$R_a$: Average Surface Roughness at Centerline, $R_t$: Highest Height at centerline
S.S.: Slurry Stability, A.R.: Abrasion Resistance, S.R.: Scratcth Resistance, T.: Transparency
R.P.: Running Property, V.R.: Void Resistance, St.: Dielectric Strength Table 1 shows that the polyester films containing polytetrafluoroethylene resin particles alone or in combination with conventional inorganic slip agent particles in accordance with the present invention have excellent surface properties, compared with the polyester film containing the inorganic slip agent particles. Therefore, the biaxially oriented polyester film prepared by the present invention are useful in manufacturing various articles.

While the invention has been described with respect to the above specific embodiments, it should be recognized that various modifications and changes may be within the scope of the invention as defined by the claims the follow.

What is claimed is:

1. A biaxially oriented polyester film consisting essentially of a polyester resin, polytetrafluoroethylene resin particles having an average particle diameter ranging from 3 to 8 µm in an amount ranging from 0.3 to 0.6% by weight based on the weight of the polyester resin employed for the preparation of the polyester film and a polyacrylate dispersant having the formula of $R_1-(CH_2CHCOOM)_n$ in an amount ranging from 0.05 to 5.0 wt % based on the weight of the polytetrafluoroethylene resin employed, wherein $R_1$ represents a $C_{9-32}$ alkyl group, M is an alkali metal or an ammonium group and n is 5–20.

2. The polyester film of claim 1 wherein the polytetrafluoroethylene resin has an average molecular weight in the range of 1,000,000 to 10,000,000.

* * * * *

UNITED STATES PATENT AND TRADEMARK OFFICE
CERTIFICATE OF CORRECTION

PATENT NO. : 5,858,527
DATED : January 12, 1999
INVENTOR(S) : Kwang-Hyung Lee, et al It is certified that error appears in the above-identified patent and that said Letters Patent is hereby corrected as shown below:

On the title page, item [30], should read as follows:

Foreign Application Priority Data

Oct. 30, 1995   [KR]   Rep. of Korea    95-38216
    Oct. 30, 1995   [KR]   Rep. of Korea    95-38217
    Oct. 31, 1995   [KR]   Rep. of Korea    95-38449
    Oct. 31, 1995   [KR]   Rep. of Korea    95-38451

Signed and Sealed this

Seventeenth Day of August, 1999

Attest:

Q. TODD DICKINSON

*Attesting Officer*     *Acting Commissioner of Patents and Trademarks*